United States Patent [19]
Bagley et al.

[11] Patent Number: 5,764,869
[45] Date of Patent: Jun. 9, 1998

[54] HOT BASED PRINTING SYSTEM WITH RASTER IMAGE DATA BUFFERING

[75] Inventors: Elizabeth L. Bagley, Meridian; Vincent J. Kenkel, Boise, both of Id.

[73] Assignee: Hewlett-Packard Company, Palo Alto, Calif.

[21] Appl. No.: 929,390

[22] Filed: Sep. 15, 1997

Related U.S. Application Data

[63] Continuation of Ser. No. 533,626, Sep. 25, 1995, abandoned.
[51] Int. Cl.$^6$ ............................................ G06K 15/00
[52] U.S. Cl. .................................. 395/115; 395/114
[58] Field of Search ........................... 395/112, 113, 395/114, 115, 116, 835, 839, 842, 876; 358/444, 404; 345/509, 511, 520, 521

[56] References Cited

U.S. PATENT DOCUMENTS 4,975,859  12/1990  Takayishi et al. ............... 395/115

*Primary Examiner*—Arthur G. Evans
*Attorney, Agent, or Firm*—Anthony J. Baca

[57] ABSTRACT

The preferred embodiment of the present invention provides a method for a host computer to improve control over the printer memory buffering in conjunction with commencing print engine motion. By requiring both data present in the printer and a "begin engine motion" notification from the host computer, print engine commencement is controlled completely by the host computer. To help the host better control the buffer, the host establishes a "memory full" threshold limit. This threshold is then transferred to the printer and is used by the printer to determine when to return a "threshold exceeded" notification to the host. After the data has moved from the printer memory buffer and onto the printed page, memory is again considered free. Once the unused portion of printer memory is larger than the memory full threshold value, the threshold exceeded status is reset.

12 Claims, 3 Drawing Sheets

HOT BASED PRINTING SYSTEM WITH RASTER IMAGE DATA BUFFERING

CROSS-REFERENCE TO RELATED APPLICATIONS

This is a continuation of application Ser. No. 0/533,626 filed on Sep. 25, 1995, now abandoned.

The present application is related to the following co-pending U.S. Patent Applications being assigned to the same assignee, entitled:

"A METHOD FOR RECOVERY OF FAULTED PAGES IN A HOST BASED PRINTING SYSTEM", U.S. patent application Ser. No. 08/537,264, now U.S. Pat. No. 5,666,539, incorporated herein by reference; and "PRINTING SYSTEM HAVING CONTROL LANGUAGE COMMAND AND RASTER PIXEL IMAGE DATA PROCESSING CAPABILITY", U.S. patent application Ser. No. 08/533,488, now U.S. Pat. No. 5,706,410, incorporated herein by reference.

TECHNICAL FILED

This invention relates to page printers, and more particularly, to a page printer that receives raster data via a standard input/output interface, the page printer employing a limited-size raster buffer, and while enabling its print mechanism to operate with high efficiency.

Background of the Invention

Presently there are two categories of printing systems, intelligent and dumb. The dumb category is the host based; or sleek, approach. The intelligent category differs in that it sends a mixture of rendered and non-rendered to the printer. It is similar to the concept of page description language (PDL) page printers like the Hewlett-Packard PCL page printers, in that the data sent across the I/O channel needs to be processed and rendered by the printer. A dumb printer only has to deal with placing an already rasterized image on paper, whereas the intelligent printer requires additional technology in the printer such as additional memory and processing power, to form the page for printing before starting the printing process.

Intelligent laser printers receive data to be printed from a host computer in the form of a control language over a standard interface. The control language data stream includes print function commands with interspersed print data. The laser printer responds by converting the received data stream into a list of simple commands, called display commands which describe what must be printed. The printer processes the display commands and renders the described objects into a raster bit map. This procedure generally requires a full page raster bit map memory, as the same memory is used for succeeding pages.

The use of control languages to enable data transfers between host computers and laser printers is widespread and must be accommodated on a commercial laser printer if that printer is to appeal to a large customer base. Such control language data is transferred to the laser printer over a standard, input/output (I/O) interface that exhibits a rather slow data transfer rate. Using that interface, a laser printer converts an incoming command language data stream into a "page intermediate" form (consisting of display commands) which is then converted to raster image data. The raster image data conversion process causes the intermediate page representation to be divided into a number of strips, with groups of the strips being sequentially processed to raster pixel data (video data for the print engine). The print engine is only started after an initial group of strips have been converted to raster pixel data. At this time the laser print engine prints the data and continues at a fixed speed, until all strips have been printed. If new rasterized data is not available at a rate that keeps up with the print engine's operation, a print "overrun" occurs and the page is not printable. As a result, considerable time is lost due to the substantial preprocessing which must occur before the print engine is started.

Some page printers employ a high speed page printing technique termed the "Sleek" mode that avoids the substantial preprocessing that occurs when print data is transferred using a print control language. In the Sleek mode, the host computer converts user input data into a full raster pixel image and then feeds that raster image as pixel data, over an interface at a high data transfer rate. Certain prior art page printers employ a separate video port that accepts video raster image data at a multi-megabit per second rate. While such printers provide highly efficient print rates, the costs inherent in the separate video ports on both the printer and the host and circuitry for handling data over those ports adds substantially to the system's cost. Nevertheless, the Sleek mode does enable a substantial increase in print speed of a laser page printer.

One of the problems with host based printing is that it requires that the host be able to supply the rasterized data at the rate that the print engine consumes it. Otherwise, the printer runs out of data to put on the already moving paper causing a fault on the page. Such faults may be known by many terms such as "page punt", "real time fault", or "page fault".

Methods for a page printer to pre-buffer some rasterized data within printer memory have been established in the past. A method for page printer receiving raster pixel image is described in U.S. patent application Ser. No. 08/054,769, entitled: "Page Printer Having Improved System For Receiving And Printing Raster Pixel Image Data From A Host Computer," filed Apr. 26, 1993 and being assigned to the same assignee as the present application, incorporated herein by reference. The header information described in this patent application allows the host minimal control over buffer usage prior to the printer processor causing print engine motion. As described in that patent application, the printer buffer must receive an initial quantity of raster pixel image data prior to beginning printing of a page. The host computer supplies a value in the header information describing how large this initial quantity of data is. However, this is no provision for allowing more than one page to be buffered before starting to print. Additionally, the threshold must be sent for each new page, adding additional overhead for each page.

The most popular sleek printing system for personal desktop computers allows complete host computer control over a printed page. In this sleek printing system, the host rasterizes all page data and sends page information and print control parameters to the page printer. By utilizing a high performance microprocessor on the host computer, the page image can be rasterized faster than letting the lower performance printer rasterize the image.

Control of the printing process is provided by the host using logical channels over an IEEE 1284 compliant parallel port. Logical channels provide the means for page definition, page control and status gathering. Because the data transmission rates from the host computer being more "bursty" and sometimes slower than the video data transmission rate to the print engine, a elastic memory buffer must be provided within the printer for a functional sleek solution.

Once the sleek host computer has rasterized the imaged, it transmits the data to the printer hardware. For transmission, the sleek host obtains a "band" of data and transmits it to the printer. During transmission of a band of data, the sleek host never selects another logical channel. Indeed the sleek printing system is dedicated to transmitting a band of data once transmission begins.

In previous sleek printing designs the host software always issues a "begin engine motion" notification prior to sending any data to the printer hardware. This implies the host does not control the printer memory buffer.

SUMMARY OF THE INVENTION

In order to accomplish the present invention there is provided a method of allowing a host computer to control a buffer memory, where the buffer memory is resident in a printer. For the printer to perform the present invention, the printer receives image data from the host computer. If a start print command has not been received from the host, the printer buffers the image data in the buffer memory. Once the start print command is received, the image data is transferred from the buffer memory to a print engine and the print engine starts printing. If the start print command is received before the image data is received, the printer waits for image data before starting the print engine in motion. Once image data is received it is transferred to the print engine and the print engine is allowed to start printing. Thus, the print engine is not started until both image data is present and a start print command have been received. The host may also transmit to the printer a threshold value. The printer reports back to the host when the buffer memory has less than the threshold value space free.

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENTS

Figure 1:
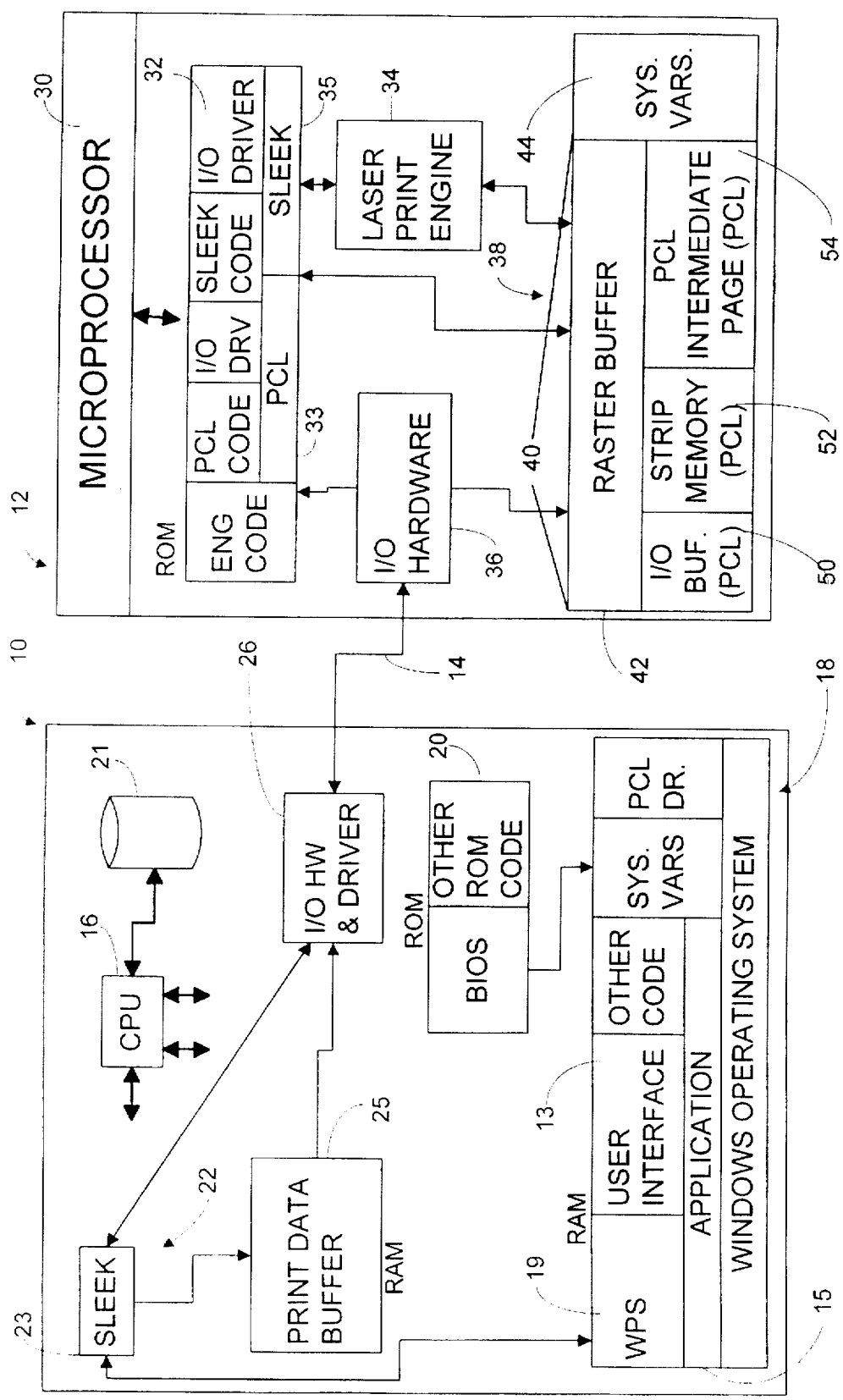
FIG. 1 is a block diagram showing internal aspects of both a host computer and an attached page printer, the host computer and page printer being connected over a standard I/O interface.

The present invention is not limited to a specific embodiment illustrated herein. Referring particularly to FIG. 1, a host computer 10 is connected to a printer 12 via a standard I/O interface 14. For the purposes of this description, it will be assumed that host computer 10 is a personal computer and that printer 12 is a laser printer. It will be further assumed that host computer 10 is connected to printer 12 via a standard I/O interface 14 of the IEEE 1284 type that enables burst data transfers at a rate of approximately 2,000,000 bytes per second and a sustained rate of about 500,000 bytes per second.

Host computer 10 includes a central processing unit 16 and a random access memory (RAM) that is segmented into a number of portions. RAM portion 18 contains software code for controlling the host computer's application, printer driver functions, and a user interface. RAM portion 18 also includes system variables, the "WINDOWS" operating system ("WINDOWS" is a trademark of the Microsoft Corporation, Redmond, Wash.), and a Windows printing system (WPS) driver 19. A read only memory (ROM) 20 includes firmware for controlling the basic input/output system (BIOS) and code for controlling other host functions. RAM portion 22 includes sleek driver software 23 for enabling host computer 10 to operate in Sleek mode. A further portion 25 of RAM is set aside to act as a buffer to contain raster image data that has been formatted by Sleek driver 23 and is ready for transfer to printer 12 via I/O hardware and driver module 26.

Within printer 12, a microprocessor 30 controls the overall functioning of the printer and its sub-components. A read only memory (ROM) 32 contains firmware code for controlling print engine 34 in both a PCL mode 33 and a Sleek mode 35. PCL mode 33 firmware enables received PCL-configured code to be converted to a page intermediate form and then formed into a raster configuration for printing by print engine 34. The I/O driver portion of PCL mode 33 controls I/O hardware module 36 to properly respond to received PCL commands and data.

Sleek mode firmware 35 is a bit map control code and includes a Sleek code section that allocates a portion of RAM 38 as an I/O buffer 40, and an I/O driver control section. I/O buffer 40 serves either as a raster image buffer 42 or as a control language/data buffer 50, 52, 54. When I/O buffer 40 is configured as a raster image buffer 42, it receives raster-formatted data from I/O hardware 36 and stores it temporarily, prior to feeding it to print engine 34. Otherwise, I/O buffer 40 is configured to include portions 50, 52, and 54 for use when receiving PCL data from host computer 10.

Figure 2:
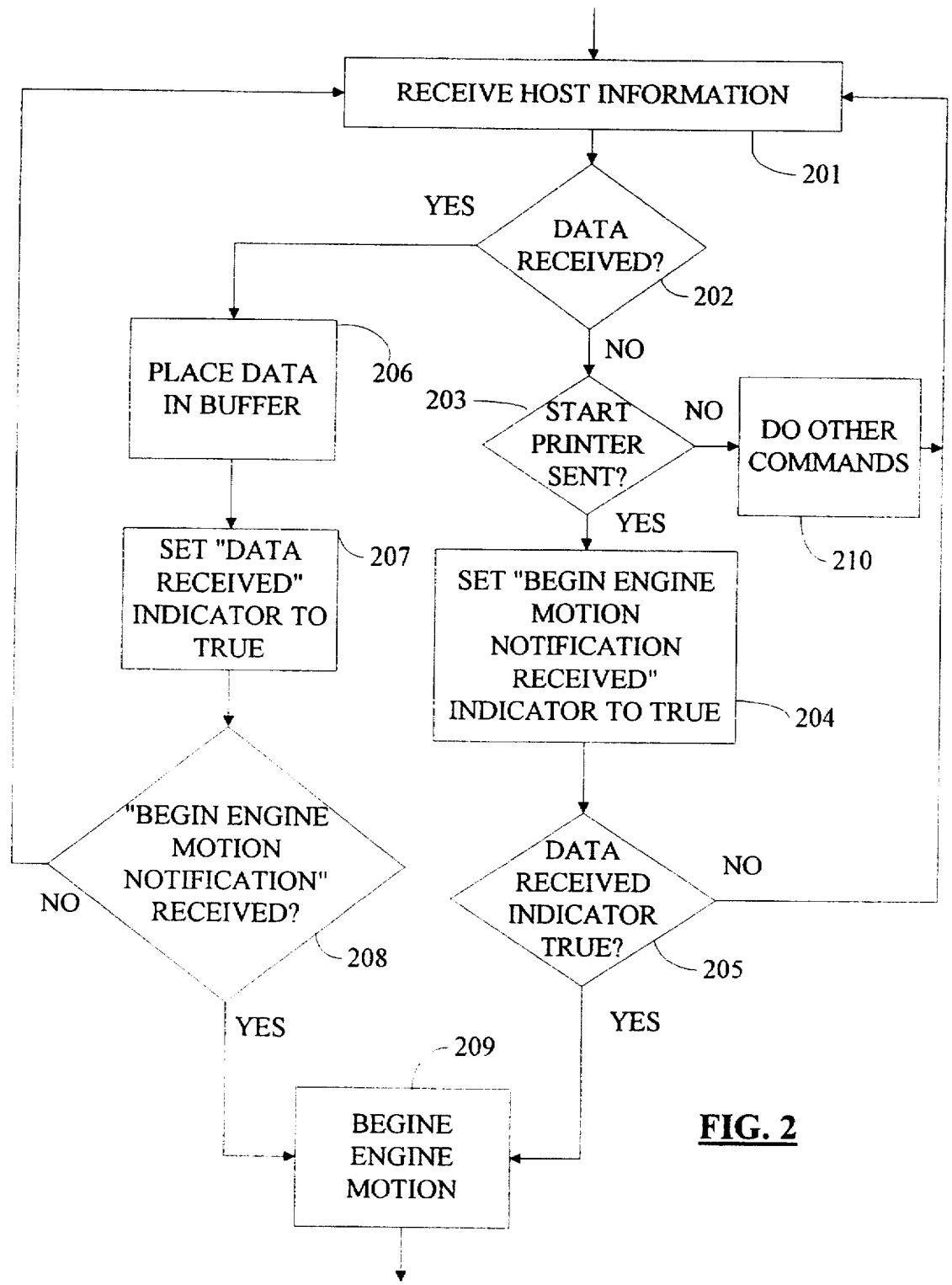
FIG. 2 is a high level flow diagram illustrating the operation of the host computer in carrying out the invention.

The preferred embodiment of the present invention provides a method for a host computer to improve control over the printer memory buffering in conjunction with commencing print engine motion. By requiring both data present in the printer and a "begin engine motion" notification from the host computer, print engine commencement is controlled completely by the host computer. Referring now to FIG. 2, where a flow diagram of the preferred embodiment of the present invention as executed by the printer is shown. Once in the host based or "sleek" mode of operation, the printer 12 waits to receive host information 201. Upon receiving information from the host computer 10, it must first be determined if the incoming information is data 202. Assuming that information is not data, it is next checked to see if it is a "begin engine" command 203. If a "begin engine") has been received, first, 204 the begin engine motion notification received indicator is set to true. This indicator signifies that the printer 12 has received the begin engine and once data is present, may start the engine. Next, if data has already been received 205, then the begin engine motion 209 command is executed. In the alternative, where no data has yet been received, execution returns back to the idle state For data information received from the host 201, 202, it must be buffered 42 in the printer 206. Next, the data received indicator is set true 207 to indicate that data is present in the buffer. The begin engine motion notification received indicator is next checked to determine whether a begin engine command has already been received 208. Assuming, that the begin engine notification command has already been received, then the engine is started 209. However, if the begin engine notification has not yet been received, then an execution returns back to the idle state 201.

For printers with memory expansion capabilities, the host computer may not know how much printer memory is available to receive data. By enabling the printer to report to the host computer how much memory is available for receiving raster data, the host may more efficiently use this information to control pre-buffering of raster data.

To accomplish this exchange of information between the host computer 10 and printer 12, the host computer 10 first establishes a "memory full" threshold limit. This threshold is then transferred to the printer 12 and is used by the printer 12 to determine when to return a "threshold exceeded" notification to the host computer 10. Once the data has moved from the raster image buffer 42 and onto the printed page, memory is again considered free. Once the unused portion of printer memory is larger than the memory full threshold value, the threshold exceeded status can be reset.

Figure 3:
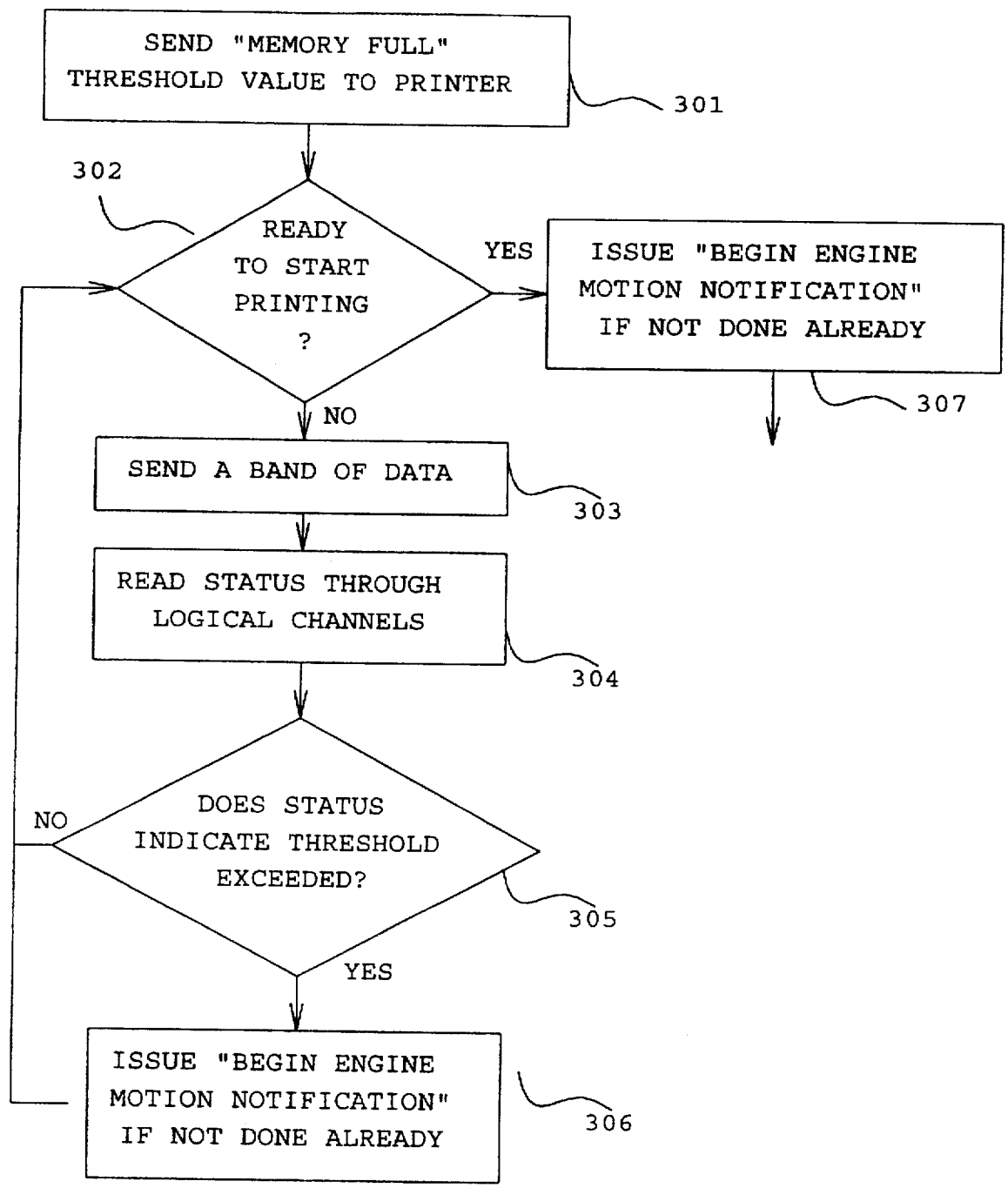
FIG. 3 is a high level flow diagram illustrating the operation of the page printer in carrying out the invention.

Referring now to FIG. 3 where a flow diagram of one possible embodiment for use by the host computer 10 of the threshold and threshold exceeded information is shown. Assuming the host computer 10 has already obtained accurate information as to the amount of memory in the printer 12, a "memory full" threshold value is sent from the host computer 10 to the printer 301. The host computer 10 then begins sending data to the printer 302, 303. After each band of data, the host computer 10 reads the printer status through one of the logical channels 304. For additional information on logical channels see co-pending application entitled "Printing System Having Control Language Command And Raster Pixel Image Data Processing Capability." Attorney Docket number 10950607-1. If the threshold has not been exceeded 305 then additional data can be sent to the printer 12. At some point, either the threshold will be exceeded, or all the data will be sent. For the scenario of the threshold being exceeded, the host computer 10 issues a begin engine notification 306. Similarly, once all the data has been sent, the host computer 10 again issues the begin notification 307. Alternatively, the host computer 10 does not need to wait for the threshold being exceeded or all the data to be sent, it may issue the begin engine notification at any time 307.

Whether host computer 10 sends data followed by the begin engine command or sends the begin engine command followed by data depends primarily on the performance level of host computer 10. For those host computers that have limited performance resources, they may be not be able to process the raster data in real-time. Buffering data in printer 12 before beginning the engine motion allows some marginal host computers to overcome their real-time limitations. As described in co-pending application "A Method For Recovery Of Faulted Pages In A Host Based Printing System", Attorney Docket Number 10950841-1, buffering data in printer 12 may also allow host computer 10 to print a complicated page without degrading the image quality.

For those host computers that have sufficient processing resources, sending the start engine motion command before sending data yields improved printing performance. In particular, assuming that host computer 10 sends the begin engine command to printer 12. Once host computer 10 starts sending data, printer 12 starts the print engine 34. Print engine 34 must perform numerous tasks prior to actually starting to print. For, example, print engine 34 must pick a sheet of media and register it. Additional, print engine 34 may need to heat the fuser. On average, print engine 34 needs about 4-5 seconds from receipt of start engine motion to actually printing. During this time delay, host computer 10 can be downloading data to printer 12.

Although the preferred embodiment of the invention has been illustrated, and that form described, it is readily apparent to those skilled in the art that various modifications may be made therein without departing from the spirit of the invention or from the scope of the appended claims.

What is claimed is:

1. A method of allowing a host computer to control a buffer memory resident in a sleek printer, said method being performed by said sleek printer, said method comprising the steps of:

first receiving raster data from said host computer;

buffering said raster data in said buffer memory until a start print command from said host computer is received; and transferring said raster data to a print engine and placing said print engine in motion only after both said start print command and said raster data are received.

2. The method of claim 1 further comprising the step of:

second receiving a threshold value; and reporting to said host when said buffer memory has less than said threshold value space free.

3. The method of claim 1 further comprising the step of:

setting a data received indicator when said step of first receiving receives said image data.

4. The method of claim 1 further comprising the step of:

setting a start print indicator when said start print command is received.

5. The method of claim 3 wherein said step of transferring including the steps of:

when said start print command is receive checking that said data received indicator is set; and if said data received indicator is set then moving said image data from said buffer memory to said print engine and beginning said print engine motion.

6. The method of claim 4 wherein:

said step of buffering transfers said image data to said print engine and places said print engine in motion if said start print indicator is set.

7. A method of allowing a host computer to control a buffer memory resident in a sleek printer, said method being performed by said sleek printer, said method comprising the steps of:

first setting a data received indicator to true when raster data is received from said host computer;

second setting a start print indicator to true when a start print command is received from said host computer;

buffering said raster data in said buffer memory if said start print indicator is false, in the alternative where said start print indicator is true then moving said raster data to a print engine and beginning print engine motion; and transferring said raster data from said buffer memory to said print engine and beginning print engine motion if said start print indicator is set true after said data received indicator is set true.

8. The method of claim 7 further comprising the step of:

receiving a threshold value; and reporting to said host when said buffer memory has less than said threshold value space free.

9. A system including a host computer and a sleek printer, said system comprising:

first memory means for storing a bit map representation of an image;

host printer driver means for enabling dispatch of said bit map representation to said sleek printer, said host printer driver means for enabling dispatch of commands to said sleek printer and enabling receipt of information from said sleek printer;

print engine means in said sleek printer; and printer processor means for controlling said sleek printer, said printer processor means arranged to receive said bit map representation and said commands, said printer processor means passes said bit map representation to said printer engine means and starts said printer engine means in motion when said bit map representation and a begin engine motion command are received.

10. A system as claimed in claim 9 further comprising:

printer memory; and said printer processor means buffers said bit map representation in said printer memory until said begin engine motion command is received.

11. A system as claimed in claim 9 wherein:

said host printer driver means sending a threshold value to said printer;

said printer processor means reporting to said host printer driver means when said printer memory has less than said threshold value space free.

12. A system as claimed in claim 10 wherein:

said printer processor means sets a data received indicator to true when said bit map representation is received from said host printer driver means;

said printer processor means sets a begin engine motion indicator to true when a begin engine motion command is received from said host printer driver means;

said printer processor means buffers said bit map representation in said printer memory if said begin engine motion indicator is false, when said start indicator is set to true, said printer processor transfers said bit map representation from said printer memory to said printer engine means and starts said printer engine means in motion; and said printer processor transfers said bit map representation to said printer engine means and starts said printer engine means in motion if said begin engine motion indicator is true.

\* \* \* \* \*